(12) United States Patent
Carruthers et al.

(10) Patent No.: US 6,508,999 B1
(45) Date of Patent: Jan. 21, 2003

(54) ALUMINUM TRIHYDROXIDE PHASE

(75) Inventors: James Donald Carruthers, Fairfield, CT (US); Eduardo A. Kamenetzky, Stamford, CT (US); Peter J. Achorn, Fairfield, CT (US)

(73) Assignee: Shell Oil Company, Houston, TX (US)

( * ) Notice: Subject to any disclaimer, the term of this patent is extended or adjusted under 35 U.S.C. 154(b) by 158 days.

(21) Appl. No.: 09/717,753

(22) Filed: Nov. 21, 2000

(51) Int. Cl.[7] .................................................. C01F 7/02
(52) U.S. Cl. ..................................................... 423/629
(58) Field of Search ................................. 423/625, 626, 423/627, 628, 629, 630, 631; 502/355

(56) References Cited

U.S. PATENT DOCUMENTS

| | | | |
|---|---|---|---|
| 2,838,444 A | 6/1958 | Teter et al. .................... 196/50 |
| 2,935,463 A | 5/1960 | Secor et al. ................. 208/120 |
| 2,973,329 A | 2/1961 | Koch, Jr. ....................... 252/463 |
| 3,032,514 A | 5/1962 | Malley et al. ............... 252/465 |
| 3,058,907 A | 10/1962 | Van Nordstrand et al. .. 208/138 |
| 3,124,418 A | 3/1964 | Malley et al. ................. 23/143 |
| 3,152,865 A | 10/1964 | Koch, Jr. ........................ 23/143 |
| 3,232,887 A | 2/1966 | Pessimisis ................... 252/435 |
| 3,287,280 A | 11/1966 | Colgan et al. .............. 252/435 |
| 3,297,588 A | 1/1967 | Kehl et al. .................. 252/432 |
| 3,328,122 A | 6/1967 | Kehl et al. ..................... 23/143 |
| 3,493,493 A | 2/1970 | Henke et al. ................ 208/264 |
| 3,623,837 A | 11/1971 | Kelly et al. ..................... 23/143 |
| 3,749,664 A | 7/1973 | Mickelson et al. ...... 208/254 H |
| 3,778,365 A | 12/1973 | Hamner et al. ............. 208/111 |
| 3,897,365 A | 7/1975 | Feins et al. .................. 252/435 |
| 3,909,453 A | 9/1975 | O'Hara .................... 252/455 R |
| 3,983,197 A | 9/1976 | Mitsche ........................ 264/56 |
| 3,994,832 A | 11/1976 | Antos ........................... 252/464 |
| 4,090,982 A | 5/1978 | Moser .......................... 252/465 |
| 4,098,874 A | 7/1978 | Mitsche et al. ............. 423/628 |
| 4,154,812 A | 5/1979 | Sanchez et al. ............. 423/626 |
| 4,179,408 A | 12/1979 | Sanchez et al. ............. 252/448 |
| 4,255,282 A | 3/1981 | Simpson ..................... 252/435 |
| 4,301,037 A | 11/1981 | Sanchez et al. ............. 252/462 |
| 4,305,811 A | 12/1981 | Johnson ...................... 208/139 |
| 4,328,130 A | 5/1982 | Kyan ...................... 252/477 R |
| 4,357,263 A | 11/1982 | Heck et al. ................. 252/439 |
| 4,395,329 A | 7/1983 | LePage et al. .......... 208/251 H |

(List continued on next page.)

FOREIGN PATENT DOCUMENTS

| | | | |
|---|---|---|---|
| EP | 0 181 035 A3 | 5/1986 | |
| EP | 0 181 035 A2 | 5/1986 | |
| EP | 0 181 035 B1 | 5/1986 | |
| EP | 0224947 | 6/1987 | |
| EP | 0309046 | 3/1989 | |
| JP | 00197418 | 7/2000 | |
| WO | 9838265 | 9/1998 | |
| WO | 9903578 | 1/1999 | |
| WO | WO 9938802 A1 * | 8/1999 | ............. C01F/7/42 |
| WO | 0041811 | 7/2000 | |
| WO | 00/41811 | 7/2000 | |
| ZA | 853675 | 5/1985 | |

OTHER PUBLICATIONS

Zeuthen, P., Andersen, K.; "Deep HDN/HDS of a Hydrocracker Feed over a Commerical Ni–Mo–P Catalyst and the Effect of Phosphorus," *ACS Petrol. Div. Preprints* 43(1) 80–82 (1998).

(List continued on next page.)

*Primary Examiner*—Stanley S. Silverman
*Assistant Examiner*—Edward M. Johnson

(57) ABSTRACT

A phase of aluminum trihydroxide and supports and catalysts made therefrom. This invention also relates to methods of producing this phase of aluminum trihydroxide and catalysts made therefrom, and to a method for improving the activity of and for regenerating catalysts having a silica-alumina support.

7 Claims, 3 Drawing Sheets

U.S. PATENT DOCUMENTS

| | | | | |
|---|---|---|---|---|
| 4,402,865 | A | | 9/1983 | Blakely ..................... 252/432 |
| 4,444,905 | A | | 4/1984 | Pessimis ..................... 502/211 |
| 4,447,556 | A | | 5/1984 | O'Hara et al. ................ 502/74 |
| 4,460,707 | A | | 7/1984 | Simpson ..................... 502/315 |
| 4,483,942 | A | | 11/1984 | Sekido et al. ............... 502/255 |
| 4,508,841 | A | | 4/1985 | Onuma et al. ................ 502/73 |
| 4,530,911 | A | | 7/1985 | Ryan et al. .................. 502/74 |
| 4,588,706 | A | | 5/1986 | Kukes et al. ............... 502/211 |
| 4,591,429 | A | | 5/1986 | Ho et al. ................ 208/254 H |
| 4,595,672 | A | | 6/1986 | Ho et al. ................... 502/219 |
| 4,652,545 | A | | 3/1987 | Lindsley et al. ............ 502/255 |
| 4,673,664 | A | | 6/1987 | Bambrick ................... 502/439 |
| 4,677,085 | A | | 6/1987 | Nevitt ......................... 502/26 |
| 4,732,886 | A | | 3/1988 | Tomino et al. ............. 502/314 |
| 4,797,196 | A | | 1/1989 | Kukes et al. ................. 208/59 |
| 4,861,746 | A | | 8/1989 | Oishi et al. ................. 502/314 |
| 4,886,594 | A | | 12/1989 | Miller ........................ 208/210 |
| 4,946,666 | A | * | 8/1990 | Brown ........................ 423/121 |
| 5,002,919 | A | | 3/1991 | Yamazaki et al. ........... 502/315 |
| 5,047,379 | A | | 9/1991 | Alyea et al. ................... 502/79 |
| 5,087,596 | A | | 2/1992 | Clark et al. .................... 502/49 |
| 5,094,993 | A | | 3/1992 | Miura et al. ................. 502/255 |
| 5,186,818 | A | | 2/1993 | Daage et al. ........... 208/254 H |
| 5,200,381 | A | | 4/1993 | Kamo ......................... 502/170 |
| 5,232,888 | A | | 8/1993 | Kamo ......................... 502/170 |
| 5,246,569 | A | | 9/1993 | Heinerman et al. ..... 208/216 R |
| 5,248,412 | A | | 9/1993 | Fujikawa et al. ....... 208/216 R |
| 5,435,986 | A | * | 7/1995 | Chiang ........................ 423/127 |
| 5,482,910 | A | | 1/1996 | Bricker et al. ............. 502/300 |
| 5,507,940 | A | | 4/1996 | Ryan ..................... 208/254 H |
| 5,545,602 | A | | 8/1996 | Nelson et al. .............. 502/314 |
| 5,972,820 | A | | 10/1999 | Kharas et al. ............... 501/127 |
| 6,015,485 | A | | 1/2000 | Shukis et al. ............... 208/112 |
| 6,429,172 | B1 | * | 8/2002 | Tsukada et al. ............. 502/439 |

OTHER PUBLICATIONS

Boone and Ekerdt, 2000, "Hydrodesulfurization Studies With a Single–Layer Molybdenum Disulfide Catalyst," Journal of Catalysis 193 1:96–102.

Carruthers and DiCamillo, 1988, "Pilot Plant Testing of Hydrotreating Catalysts—Influence of Catalyst Condition, Bed Loading and Dilution," Appl. Catal., 43:253–276.

Clausen, et al., 1981, "Extended X–Ray Absorption: Fine Structure Study of Co–Mo Hydrodesulfurization Catalysts," J. Phys. Chem. 85:3868–3872.

Corma, et al., 1995, "Hydrocracking of Vacuum Gasoil on the Novel Mesoporous MCM–41 Aluminosilicate Catalyst," Journal of Catalysis, 153 1:25–31.

Daage and Murray, 1993, "Coordination of DBT on $MoS_2$: A Molecular Mechanics Study," Am. Chem. Soc. 38:660–664.

Datye, et al., 1996, "Oxide Supported $MoS_2$ Catalysts of Unusual Morphology," J. Catal., 158 1:205–216.

Dumeignil and Grimblot, 1999, "Synthesis, Characterization & HDS Activityof $CoMo/Al_2O_3$ Catalysts Prepared by Two Ways (Impregnation of a Sol–Gel Alumina and Complete Sol–Gel Synthesis)," Stud. Surface Sci. Catal., 127:357–366.

Eijsbouts, et al., 1991, The Effect of Phosphate on the Hydrodenitrogenation Activity and Selectivity of Alumina Supported Sulfided Mo, Ni, and Ni–Mo Catalysts, J. Catal., 131:412–432.

Eijsbouts, et al., 1993, "$MoS_2$ Structures in High–Activity Hydrotreating Catalysts. I. Semi–Quantitative Method for Evaluation of Transmission Electron Microscopy Results. Correlations Between Hydrodesulfurization and Hydrodenitrogenation Activities and $MoS_2$ Dispersion," Appl. Catal. A:General 105:53–68.

Eijsbouts, et al., 1993, "$MoS_2$ Structuresin High–Activity Hydrotreating Catalysts. II. Evolution of the Active Phase During the Catalyst Life Cycle. Deactivation Model," Appl. Catal. A:General 105:69–82.

Farag, et al., 1999, "Carbon Versus Alumina as a Support for Co–Mo Catalysts Reactivity Towards HDS of Dibenzothiophenes and Diesel Fuel," Catal. Today, 50 1:9–17.

Grimblot, 1998, "Genesis, Architecture and Nature of Sites of Co(Ni)–MoS2 Supported hydroprocessing Catalysts," Catal. Today, 41 1–3:111–112.

Gulkova and Vit, 1995, "Silica–Ceria as Support for the Preparation of NiMo(P) Hydrodesulfurization and Hydrodenitrogenation Catalysts," Appl. Catal. A:General 125 1:61–70.

Ho, 1988, "Hydrodenitrogenation Catalysis," Catal. Rev.–Sci. Eng., 30:117–160.

Kim and Woo, 1991, "Effect of Sulfiding Temperatures on the Formation of Sulfides of $Mo/Al_2O_3$ and $CoMo/Al_2O_3$," Appl. Catal. 74:109–123.

Kisfaludi, et al., 1991, "An EXAFS Study of the Spreading of $MoO_3$ on the Surface of $\gamma$–Al2O3," J. Catal. 130:192–201.

Kiviat and Petrakis, 1973, "Surface Acidity of Transition Metal Modified Aluminas. Infrared and Nuclear Magnetic Resonance investigation of Adsorbed Pyridine," J. Phys. Chem. 77:1232–1239.

Kimova and Ramirez, 1998, "New Mo and NiMo Catalysts Supported on MCM–41/Alumina for Thiophene Hydrodesulfurization," Stud. Surface Sci. Catal. 117:493–500.

Knozinger and Ratnasamy, 1978, "Catalytic Aluminas: Surface Models and Characterization of Surface Sites," Catal. Rev.–Sci. Eng. 17:31–70.

Landau, et al., 1996, "Medium–Severity Hydrotreating and Hydrocracking of Israeli Shale Oil: 1. Novel Catalyst Systems," Fuel, 75 7:858–886.

Lecrenay, et al., 1998, "Hydrodesulfurization Activity of CoMo and NiMo Catalysts Supported on Some Acidic Binary Oxides," Appl. Catal. A, 175 1–2:237–240.

Ledoux, et al., 1995, "The Role of the Nature and the Purity of the Alumina Support on the hydrodesulfurization Activity of CoMo Sulfides," Appl. Catal. A. 133 2:321–333.

Linsen, et al., eds. 1970, "Physical and Chemical Aspects of Adsorbents and Catalysts," Academic Press, pp. 172–211.

Lipsch and Schuit, 1969, "The $CoO$–$MoO_3$–$Al_2O_3$ Catalyst," J. Catal. 15:174–178.

Mangnus, et al., 1991, "Influence of Phosphate on the Structure of Sulfided Alumina Supported Cobalt–Molybdenum Catalysts," Appl, Catal. 68:161–177.

McMillan, et al., 1989, "A $^{29}$Si NMR Investigation of the Structure of Amorphous Silica–Alumina Supports," Colloids and Surfaces, 38:133–148.

Perland Hannan, Oct. 1960, "Surface Hydroxyl Groups on $\gamma$–Alumina," J. Phys. Chem. Oct (1960):1526–1530.

Peri, 1965, Infrared and Gravimetric Study of the Surface Hydration of $\gamma$–Alumina, J. Phys. Chem. 69:211–219.

Peri, 1965, "A Model for the Surface of $\gamma$–Alumina," J. Phys. Chem. 69:220–230.

Reardon, et al., 1998, "Tailoring Alumina Surface Chemistry for Efficient Use of Supported $MoS_2$," J. Catal., 173 1:145–150.

Reinhoudt, et al., 1999, Catalysis for Second–Stage Deep Hydrodesulfurization of Gas Oils, Fuel Proc. Tech., 61–1–2:133–140.

Robinson, et al., 1999, "Development of Deep Hydrodesulfurization Catalysts. 1. CoMo and NiMo Catalysts Tested With (Substituted) Dibenzothiophene," Fuel Proc. Tech., 61 1–2:89–101.

Sakanishi, et al., 2000, "Hydrodesulfurization Kinetics and Mechanism of 4,6–Dimethyldibenzothiophene Over NiMo Catalyst Supported on Carbon," J. Mol. Catal. A:Chemical, 155 1–2:101–107.

Sault, et al., 1996, "Ceramic Catalyst Materials," ORNL/FMP(U.S.) 1996, 96 1:319–332.

Sawyer and Tackett, 1963, "Properties and Infrared Spectra of EthylenediaminetetraaceticAcid Complexes. V. Bonding and Structure of Several Metal Chelates in Solution," vol. 85, Aug. 20, 1963, Contribution from the Dept. of Chemistry, Univ. of California, Riverside, 85:2390–2394.

Scheffler, et al., 1988, Sulfidability and Hydrodesulfurization Activity of Mo Catalysts Supported on Alumina, Silica, and Carbon, J. Catal., 112:516–527.

Schrader and Cheng, 1983, "In Situ Laser Raman Spectroscopy of the Sulfiding of $Mo/\gamma-Al_2O_3$ Catalysts," J. Catal., 80:369–385.

Stanislaus, et al., 1988, "Effect of Phosphorus on the Acidity of $\gamma$–Alumina and on the Thermal Stability of $\gamma$–Alumina Supported Nickel–Molybdenum Hydrotreating Catalysts," Appl. Catal., 39(19):239–253.

Tanaka, et al., 1996, "Hydrodesulfurization of Thiophene, Dibenzothiophene and Gas Oil on Various $Co-Mo/TiO_2-Al_2O_3$ Catalysts," Catal., Today, 29 1–4:209–213.

Topsoe, 1980, "Infrared Study of Sulfided $Co-Mo/Al_2O_3$ Catalysts: The Nature of Surface Hydroxyl Groups," J. Catal. 64:235–237.

Topsoe, et al., "In Situ mossbauer Emission Spectroscopy Studies of Unsupported and Supported Sulfided Co–Mo Hydrodesulfurization Catalysts: Evidence for and Nature of a Co–Mo–S Phase," J. Catal., 68:433–452 No Date.

Topsoe and Clausen, 1984, "Importance of Co–Mo–S Type Structures in Hydrodesulfurization," Catal. Rev.–Sci. Eng., 26:395–420.

Topsoe and Clausen, 1986, "Active Sites and Support Effects in Hydrodesulfurization Catalysts," Appl. Catal. 25:273–293.

Van Doorn, et al., 1990, "High–Resolution Electron Microscopy of Spent $Ni-Mo/Al_2O_3$ Hydrotreating Catalysts," Appl. Catal., 63:77–90.

Van Veen, et al., 1987, "A Real Support Effect on the Activity of fully Sulphided CoMoS for the Hydrodesulphurization of Thiophene," 1987 J. Chem. Soc., Chem. Comm.:1684–1686.

Van Veen, 1988, "A Method for the Quantitative Determination of the Basic Hydroxyl Groups on an Alumina Surface," J. Colloid Interface Sci. 121:214–219.

Violante and Violante, 1980, "Influence of pH, Concentration, and Chelating Power of Organic Anions on the Synthesis of Aluminum Hydroxides and Oxyhydroxides," Clays and Clay Minerals, 28:425–434.

Wivel, et al., 1981, "On the Catalytic Significance of a Co–Mo–S Phase in Co–Mo/Al2O3 Hydrodesulfurization Catalysts: Combined in Situ Mossbauer Emission Spectroscopy and Activity Studies," J. Catal. 68:453–463.

Yoshimura, et al., 1991, "Molybdate Catalysts Prepared by a Novel Impregnation Method—Effect of Citric Acid as a Ligand on the Catalytic Activities," Appl. Catal. A:General, 79:145–159.

Zanibelli, et al., 1999, "The Influence of Zeolite Introduction on the HDS Activity of CoMo Catalysts," Stud. Surface Sci. Catal., 127:357–360.

Kongyuan, et al., 1996, "Development of Distillate HDS Catalyst," Cuihua Xuebao, 17 5:401–406.

Hannerup, P.N.: "Hydrotreating Catalysts," Chem. Ind. Dig. (1997), 10(1), 112–115, CA:126:319130.

Perot, G: d'Araujo, P.; Vivier, L; Kasztelan, S.; RamoaRibeiro, F.; "Mechanism of Hydrodenitrogenation of Aromatic Compounds—Structural and Competition Effects," ACS Petrol. Div. Preprints 38 (3) 712–715(1993).

Sawyer, D.T.; Tackett, J.E.; "Properties and Infrared Spectra of Ethylenediaminetetraacetic Acid Complexes, V. Bonding and Structure of Several Metal Chelates in Solution," J. Am. Chem. Soc., 85, 2390 (1963).

* cited by examiner

ALUMINUM TRIHYDROXIDE PHASE

FIELD OF THE INVENTION

This invention relates to a newly discovered phase of aluminum trihydroxide. This invention further relates to catalysts made from this new phase of aluminum trihydroxide, which catalysts may be specifically formulated to provide improved performance characteristics for a great number of hydrocarbon processing operations. This invention also relates to methods of producing this new phase of aluminum trihydroxide and catalysts made therefrom, and to a method of improving the activity of catalysts having a silica-alumina support.

BACKGROUND OF THE INVENTION

The art relating to alumina-containing supports, impregnating such supports with various catalytically active metals, metal compounds and/or promoters, and various uses of such impregnated supports as catalysts, is extensive and relatively well developed. As a few of the many exemplary disclosures relating to these fields may be mentioned the following United States patents, all of which are incorporated herein by reference for all purposes as if fully set forth U.S. Pat. Nos. 2,838,444; 2,935,463; 2,973,329; 3,032,514; 3,058,907; 3,124,418; 3,152,865; 3,232,887; 3,287,280; 3,297,588; 3,328,122; 3,493,493; 3,623,837; 3,749,664; 3,778,365; 3,897,365; 3,909,453; 3,983,197; 4,090,874; 4,090,982; 4,154,812; 4,179,408; 4,255,282; 4,328,130; 4,357,263; 4,402,865; 4,444,905; 4,447,556; 4,460,707; 4,530,911; 4,588,706; 4,591,429; 4,595,672; 4,652,545; 4,673,664; 4,677,085; 4,732,886; 4,797,196; 4,861,746; 5,002,919; 5,186,818; 5,232,888; 5,246,569; 5,248,412 and 6,015,485.

While the prior art shows a continuous modification and refinement of such catalysts to improve their catalytic activity, and while in some cases highly desirable activities have actually been achieved, there is a continuing need in the industry for even higher activity catalysts, which are provided by the present invention.

Much of the effort to develop higher activity catalysts has been directed toward developing supports that enhance the catalytic activity of metals that have been deposited thereon. In an overwhelming majority of applications the material chosen for a support is alumina, most often γ-alumina, but silica-alumina composites, zeolites and various other inorganic oxides and composites thereof have been and are employed as support materials. In the case of alumina, various researchers have developed methods for preparing supports having various surface areas, pore volumes and pore size distributions that, when appropriate metals are applied, are particularly suited for catalyzing a desired reaction on a particular feedstock, whether that reaction be directed toward hydrodesulphurization, hydrodemetallation, hydrocracking, reforming, isomerization and the like.

In most cases, the γ-alumina supports are produced by activation (usually calcination) of pseudo-boehmite (AlOOH) starting material. On rare occasions, the support has been generated from one of the heretofore known aluminum trihydroxides ($Al(OH)_3$), Gibbsite, Bayerite or Nordstrandite. When Bayerite or Nordstrandite is used as starting material, the resulting dehydrated alumina has a structure different from the more typical γ-alumina, often referred to as η-alumina; for Gibbsite, the product alumina can be χ-alumina. Each of these transitional aluminas possesses different textures (porosities and surface areas) from the more common γ-alumina. However, they generally suffer from lower thermal stability than γ-alumina; for a specific dehydration and calcination procedure, the loss of surface area for these aluminas is much greater than would be experienced by γ-alumina. U.S. Pat. No. 6,015,485 teaches a way to enhance the texture of γ-alumina supported catalysts by the in-situ synthesis of a crystalline alumina on the γ-alumina base support. From that teaching, higher activity catalysts have been produced.

As an example of the need for higher activity catalysts may be mentioned the need for a higher activity first stage hydrocracking catalyst. In a typical hydrocracking process, higher molecular weight hydrocarbons are converted to lower molecular weight fractions in the presence of a hydrocracking catalyst which is normally a noble metal impregnated silica-alumina/zeolite. State-of-the-art hydrocracking catalysts possess a very high activity and are capable of cracking high volume throughputs. Such catalysts, however, are highly sensitive to contaminants such as sulfur, metals and nitrogen compounds, which consequently must be removed from the hydrocarbon stream prior to the cracking. This is accomplished in first stage hydrocracking processes such as hydrodenitrogenation, hydrodesulfurization and hydrodemetallation. Hydrotreating catalysts utilized in these processes are typically a combination Group VIB and Group VIII metal impregnated alumina substrate. State-of-the-art hydrotreating catalysts, however, are not sufficiently active to allow processing of the same high volume throughputs as can be processed by the hydrocracking catalysts. As such, the first stage hydrocracking processes form a bottleneck in the overall hydrocracking process, which must be compensated, for example, in the size of the hydrotreating unit relative to the hydrocracking unit.

SUMMARY OF THE INVENTION

In accordance with the present invention, there is provided, in one aspect, a newly discovered phase of aluminum trihydroxide that is produced by hot-aging formed and calcined silica-alumina support made from amorphous alumina-rich silica-alumina powder in an acidic, aqueous environment. This newly discovered aluminum trihydroxide phase, herein named "Kamenetsite", can be distinguished from the three previously known phases, Gibbsite, Bayerite and Nordstrandite, by X-ray Diffraction analysis. When subjected to drying and calcination, Kamenetsite forms a material that is texturally and structurally different from other supports. The catalysts made from this material exhibit exceptionally high catalytic activity in many hydrotreating and non-hydrotreating reactions. Indeed, by appropriate adjustment of the aging conditions used in the production of Kamenetsite, the final texture of the catalyst can be tailored to a specific catalytic application. There is evidence that catalysts containing the same active metals and active metals loading perform differently with certain petroleum feedstocks depending upon the size and concentration of the crystalline alumina particles produced from different Kamenetsite-containing support precursors.

Also provided in this invention is a method of making Kamenetsite from amorphous alumina-rich silica-alumina powder. This method involves process steps that are similar to those taught in an earlier patent (U.S. Pat. No. 6,015,485). In the present invention, however, the starting material is different from that used in '485 and the product of the process may be distinguished by the size and concentration of the crystalline alumina particles produced and in the performance of catalysts made from the support produced.

In another aspect, the present invention provides high activity catalysts comprising supports based upon Kamenetsite and impregnated with one or more metals from Group VIB and Group VIII of the Periodic Table.

In addition to the above catalyst, the present invention also provides a process for improving the activity of a catalyst composition comprising a particulate porous support comprising silica-alumina and amorphous alumina, and impregnated with one or more catalytically active metals, by the steps of:

(1) wetting the catalyst composition by contact with a chelating agent in a carrier liquid;
(2) aging the so-wetted substrate while wet;
(3) drying the so-aged substrate at a temperature and under conditions to substantially volatilize the carrier liquid; and
(4) calcining the so-dried substrate.

This process can readily be applied to existing catalysts comprising a particulate porous support containing silica-alumina and amorphous alumina, or can be utilized in a catalyst manufacture process concurrently with and/or subsequent to the impregnation of the support containing silica-alumina and amorphous alumina, with one or more catalytically active metals and/or compounds thereof. In addition, the process can be utilized to improve the activity of spent catalysts during regeneration, which spent catalysts comprise a particulate porous support containing silica-alumina and amorphous alumina, wherein the spent catalyst is wetted as in step (1) above subsequent to the removal of carbonaceous deposits therefrom, followed by steps (2), (3) and (4).

By performing these steps in the indicated order, it is believed (without wishing to be bound by any particular theory) that an interaction takes place between at least the silica-alumina, amorphous alumina, chelating agent and aqueous acid which, when subjected to the temperature and time conditions of the aging step, results in the appearance of Kamenetsite. Upon drying and calcining the product from this reaction a crystalline phase of alumina that may be distinguished from that produced in U.S. Pat. No. 6,015,485 by the size and concentration of the crystalline alumina particles produced. Crystallite size at the catalyst surface can be measured via well-known techniques involving transmission electron microscopy.

Concurrent with the appearance of this crystalline phase, an increase in the surface area of the catalyst is also achieved. In addition, in preferred embodiments, a structure is generated with a porosity peaking in a first region of pore size 40 Å or less, and more preferably in the range of 20 Å to 40 Å, as measured by nitrogen porosimetry using the desorption isotherm.

The resulting high activity catalysts find use in a wide variety of fields as detailed in the many previously incorporated references. A particularly preferred use is as a first stage hydrocracking catalyst in hydrodenitrogenation, hydrodesulfurization and hydrodemetallation.

These and other features and advantages of the present invention will be more readily understood by those of ordinary skill in the art from a reading of the following detailed description.

DETAILED DESCRIPTION OF THE INVENTION

A. New Aluminum Trihydroxide Phase (Kamenetsite)

Starting Material

Figure 1:
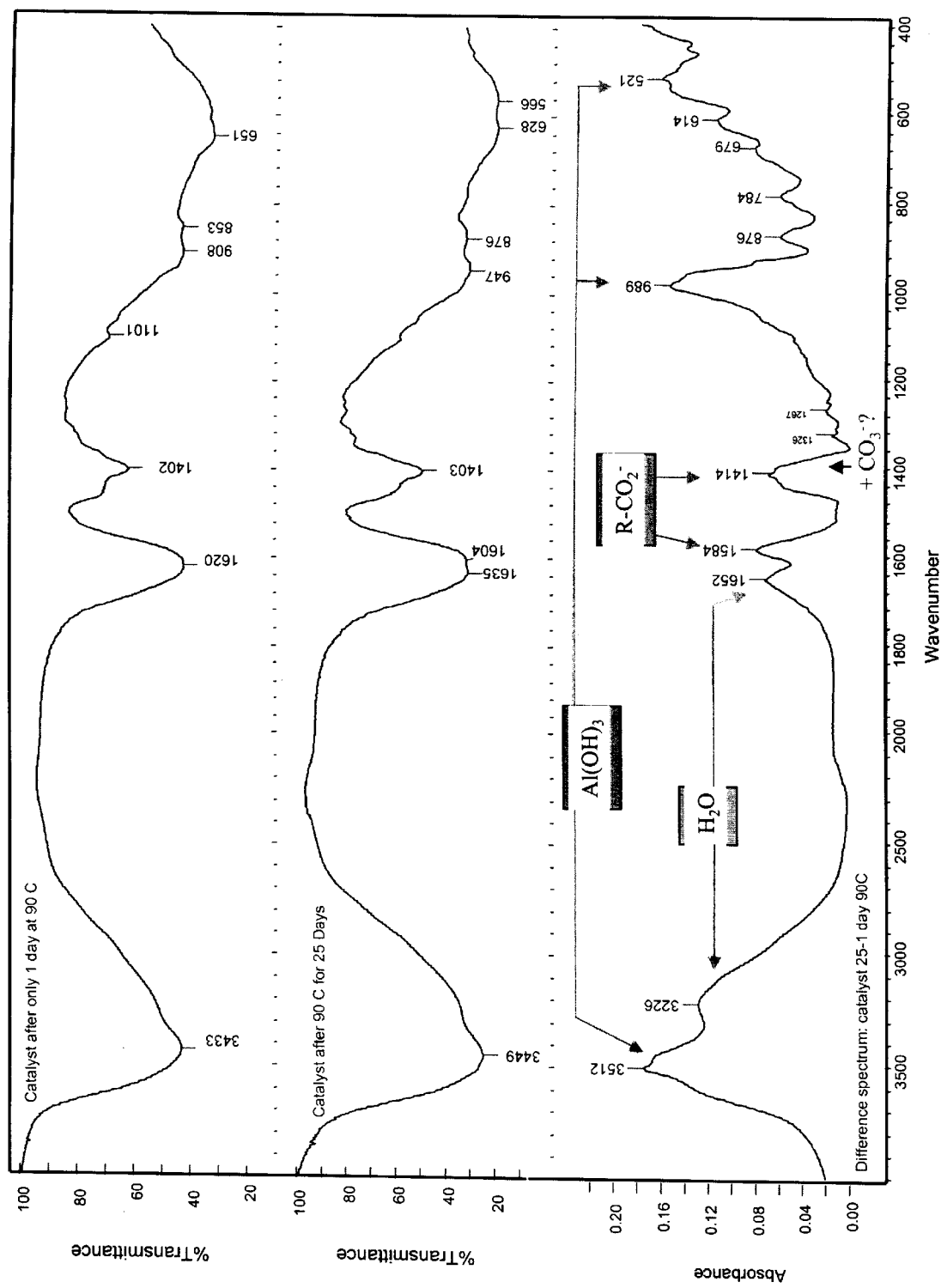
FIG. 1 shows the FTIR spectra of the aluminum trihydroxide of the present invention, aged at 90° C. for 1 day and for 25 days, and of 1-day-aged material spectrum subtracted from the 25-day-aged material spectrum.

The preferred starting material for the production of Kamenetsite is silica-alumina powder containing a substantial percentage of amorphous alumina. A measurable concentration of Kamenetsite may be produced from powder comprising as little as 4 wt. % silica and the balance alumina, at least about 20 wt. % of which is amorphous alumina and from a powder comprising as much as 8 wt. % silica and the balance alumina, at least about 30 wt. % of which is amorphous alumina. Preferably, the starting material contains between about 5 wt. % and about 7 wt. % silica and the balance alumina, with between about 20 wt. % and about 50 wt. % of the alumina being amorphous.

Method of Making

The new aluminum hydroxide phase of this invention may be prepared by:

(1) wetting the starting material by contact with a chelating agent in a carrier liquid and an acidic solution of a metal compound;
(2) aging the so-wetted starting material while wet at conditions (i.e., a combination of temperature and duration of aging) that will produce the desired amount of Kamenetsite, preferably at temperatures higher than 50° C. for from 1 to 10 days;
(3) drying the so-aged starting material at a temperature and under conditions to substantially volatilize the carrier liquid; and
(4) calcining the so-dried material.

Chelating agents suitable for use in this process include those known to form more stable complexes with transition metals and aluminum and, consequently, possess high stability constants with respect thereto. Particularly preferred for use in the present invention is ethylenediaminetetraacetic acid (EDTA) and derivatives thereof including, for example, N-hydroxy ethylenediaminetetraacetic acid and diammonium ethylenediaminetetraacetic acid. Also suitable are tris (2-aminoethyl)amine and triethylenetetraamine. Other candidates include diethylenetriaminepentaacetic acid, cyclohexanediaminetetraacetic acid, ethyleneglycol-bis-(beta-aminoethylether)-N,N'-tetraacetic acid, tetraethylenepentaamine and the like. The suitability of other chelating agents can be readily determined by those of ordinary skill in the art by treating a starting material sample in accordance with the present invention and then, prior to drying and calcining the sample, determining with the aid of transmission electron microscopy or X-ray Diffraction whether or not Kamenetsite of appropriate crystallite size has formed.

The amount of chelating agent utilized is not critical to producing Kamenetsite, but does have an influence on the amount produced. Widely varying amounts of chelating agent can be utilized depending on a number of factors such as solubility in the carrier liquid, type of catalyst support and metals impregnated or to be impregnated thereon. Generally, the starting material should be wetted by a carrier liquid containing the chelating agent in amounts ranging from 0.01–1.0 grams of chelating agent per gram of starting material.

The material may be wetted by any normal method such as dipping or spraying. To ensure adequate infiltration of the chelating agent, dipping is preferred followed by a soaking period. The preferred carrier liquid is water or a water/ammonia solution.

The length of time necessary for aging of the wet starting material is a function of the temperature during aging. At room temperature, it is preferred to age the wetted substrate for at least 30 days, more preferably at least 60 days. As temperature increases, the required aging time decreases. At 80° C., it is preferred to age the wetted material for at least two days, more preferably at least three days. Preferably, aging is accomplished at a temperature in the range of 20° C. to 90° C.

Subsequently, the aged material is dried to substantially remove the carrier liquid. It is preferred that the drying take place slowly at first and then rapidly at elevated temperatures in the range of 100° C. to 250° C. Preferably, a forced air heater is utilized to speed drying to a preferred time of less than one hour.

The so-dried material is then calcined under conditions well-known to those of ordinary skill in the art. Preferably, however, the calcination takes place in two stages—a first lower temperature stage in which the temperature is sufficiently high to drive off or decompose any remaining chelating agent, but which is not so high that the chelating agents combusts to form carbonaceous deposits. This first stage temperature will vary depending on the particularly chelating agent, but typically a temperature within the range of 250° C. to 350° C. will be sufficient. Once any remaining chelating agent is substantially removed, the catalyst may then be calcined under the normal higher temperature conditions commonly utilized.

B. Catalysts

Method of Making Kamenetsite-containing Catalysts

The procedure for making Kamenetsite described above may be adapted for producing a finished catalyst. The starting material may first be formed into the desired support shape by methods known to those skilled in the art. The formed, calcined support can then be wetted with the chelating agent/carrier liquid either prior to, concurrently with and/or subsequent to the impregnation of the support with the appropriate catalytically active metals, followed by steps (2) through (4) as described above. It is only important to ensure that the aging step takes place while the impregnated support is wet from the carrier liquid for the chelating agent and the acidic solution of impregnation metals.

Catalytically Active Metals

The present invention is applicable to catalysts impregnated with one or more of a wide variety of catalytically active metals well-known to those of ordinary skill in the art as exemplified, for example, by the numerous incorporated references. In the context of the present invention, "catalytically active metals" includes both the metals themselves as well as metal compounds. In addition to the catalytically active metals, the catalysts may also be impregnated with one or more well-known promoters such as phosphorous, tin, silica and titanium (including compounds thereof).

Typically, the catalytically active metals are transition metals selected from the group consisting of Group VIB metals, Group VIII metals and combinations thereof. The specific choice of metal(s), promoter(s) and loadings, of course, depends upon the desired end use of the catalyst, and these variables can readily be adjusted by those of ordinary skill in the art based upon the end use. As specific examples thereof may be mentioned the following (wt % is based on the total catalyst weight):

| Hydrotreating Operations | |
| --- | --- |
| Hydrodenitrogenation | Ni and/or Co, and preferably Ni, in an amount up to 7 wt % calculated as NiO and/or CoO |
| | Mo and/or W, preferably Mo, in an amount up to 35 wt. % calculated as $MoO_3$ and/or $WO_3$ |
| | optionally P, and preferably including P, in an amount up to 10 wt % calculated as $P_2O_5$ |
| Hydrodesulfurization | Ni and/or Co, and preferably Co, in an amount up to 9 wt % calculated as NiO and/or CoO |
| | Mo and/or W, preferably Mo, in an amount up to 35 wt % calculated as $MoO_3$ and/or $WO_3$ |
| | optionally P, and preferably including P, in an amount up to 10 wt % calculated as $P_2O_5$ |
| Hydrodemetallation | optionally Ni and/or Co, and preferably including Ni and/or Co, in an amount up to 5 wt % calculated as NiO and/or CoO |
| | Mo and/or W, preferably Mo, in an amount up to 20 wt % calculated as $MoO_3$ and/or $WO_3$ |
| | optionally P, and preferably including P, in an amount up to 10 wt % calculated as $P_2O_5$ |
| Hydroconversion | Ni and/or Co, and preferably Ni, in an amount up to 5 wt % calculated as NiO and/or CoO |
| | Mo and/or W, preferably Mo, in an amount up to 20 wt % calculated as $MoO_3$ and/or $WO_3$ |
| | optionally P, and preferably including P, in an amount up to 6 wt % calculated as $P_2O_5$ |
| Hydrocracking | Ni and/or Co, and preferably Ni, in an amount up to 5 wt % calculated as NiO and/or CoO |
| | Mo and/or W, preferably Mo, in an amount up to 20 wt % calculated as $MoO_3$ and/or $WO_3$ |
| | optionally P, and preferably including P, in an amount up to 10 wt % calculated as $P_2O_5$ |

-continued

| | |
|---|---|
| Hydrogenation/ Dehydrogenation | a noble metal, and preferably Pt or Pt in combination with Rh, in an amount up to 2 wt % calculated on an elemental basis |
| Reforming | a noble metal, and preferably Pt or Pt in combination with another noble metal such Re and/or Ir, and/or Sn, in an amount up to 2 wt % calculated on an elemental basis |
| Non-Hydrotreating Operations | |
| Isomerization | a noble metal, and preferably Pt or Pt in combination with another noble metal, in an amount up to 2 wt % calculated on an elemental basis |
| Claus Process | Ni and/or Co, and preferably Ni, in an amount up to 5 wt % calculated as NiO and/or CoO<br>Mo and/or W, preferably Mo, in an amount up to 20 wt % calculated as $MoO_3$ and/or $WO_3$<br>optionally P, and preferably including P, in an amount up to 6 wt % calculated as $P_2O_5$ |

Such catalysts are prepared by impregnating the supports with the appropriate components, followed by various drying, sulfiding and/or calcining steps as required for the appropriate end use. Such catalyst preparation is generally well-known to those of ordinary skill in the relevant art, as exemplified by the numerous previously incorporated references, and further details may be had by reference thereto or numerous other general reference works available on the subject.

Catalyst Regeneration

As indicated above, the process in accordance with the present invention is not only applicable to pre-formed catalysts, but also can be applied to regenerated catalysts in a like manner. Specifically, subsequent to the removal of carbonaceous material from a spent catalyst via well-known procedures, such catalysts are then be treated by steps (1) through (4) in an identical manner as described above.

Catalysts Tailored to a Specific Operation

By careful selection of temperature and time during the aging step, the concentration and crystallite size of the Kamenetsite along with its ultimate pore structure can be modified. The modified catalyst then displays a different response to, for example, the hydrodesulfurization of a pair of gas oils. One possibility for tailoring a catalyst of the present invention is discussed in Example 9 below. Example 9 is meant to be illustrative of the possibilities that accrue from the present invention and is not intended to be limiting in any way. Those skilled in the art are capable of identifying other such opportunities.

C. Characterization of Kamenetsite

X-ray diffraction analysis using copper Kα radiation of crystals of the newly discovered aluminum trihydroxide phase confirm that the material is different from the three previously known phases of aluminum trihydroxide. As shown in Table 1 below, Kamenetsite exhibits a very strong peak at 2θ=18.33°, the same angle as the major peak for Gibbsite and reasonably close to the major peaks of Nordstrandite and Bayerite. Across the remainder of the diffraction pattern, however, Kamenetsite shows significant peaks at diffraction angles where the other phases do not and does not show peaks at angles where they do. The positions of the Kamenetsite diffraction lines are quoted here to a relative precision of 1% (95% Confidence Index) and relative intensities to a relative precision of 10% (95% CI).

TABLE 1

| Diffraction Line 2θ, ° | Relative Intensity | | | |
|---|---|---|---|---|
| | Kamenetsite (1) | Gibbsite (2) | Nordstrandite (2) | Bayerite (2) |
| 18.33 | 100 | 100 | — | — |
| 18.50 | — | — | 100 | — |
| 18.80 | — | — | — | 100 |
| 20.25–20.55 | — | 36 | 30 | 70 |
| 27.63 | 3 | — | — | — |
| 35.12 | 5 | — | — | — |
| 36.47 | 25 | — | — | — |
| 37.55 | — | — | 30 | — |
| 39.76 | — | — | 30 | — |
| 39.87 | 38 | — | — | — |
| 40.50 | — | — | — | 100 |
| 52.09 | 33 | — | — | — |
| 63.12 | 6 | — | — | — |

(1) All diffraction lines that grow with aging, indicating an increase in the concentration of the new phase, are shown.
(2) Only major diffraction lines are shown for Gibbsite, Nordstrandite and Bayerite.

Kamenetsite crystallite size and the integrated intensity of the X-ray diffraction line at 2θ=18.33° both increase with increased aging temperature and duration of aging as shown in Table 2.

TABLE 2

| Aging Temperature, ° C. | Duration of Aging, days | Crystallite Size, Å | Integrated Intensity of line at 2θ = 18.33°, counts |
|---|---|---|---|
| 90 | 1 | 35 | 1972 |
| | 2 | 48 | 2354 |
| | 3 | 55 | 3086 |
| | 5 | 61 | 3510 |
| | 7 | 64 | 4039 |
| | 10 | 72 | 4438 |
| 80 | 1 | 23 | 2165 |
| 75 | 3 | 24 | 1246 |

Thermogravimetric Analysis (TGA) and X-ray diffraction of Kamenetsite-containing materials heated to high temperatures show the disappearance of the major peak at 2θ=18.33° at about 250° C. Since 250° C. is the known transformation temperature of aluminum trihydroxides to transition aluminas, these data confirm that the new material is a distinct new phase of aluminum trihydroxide.

Figure 2:
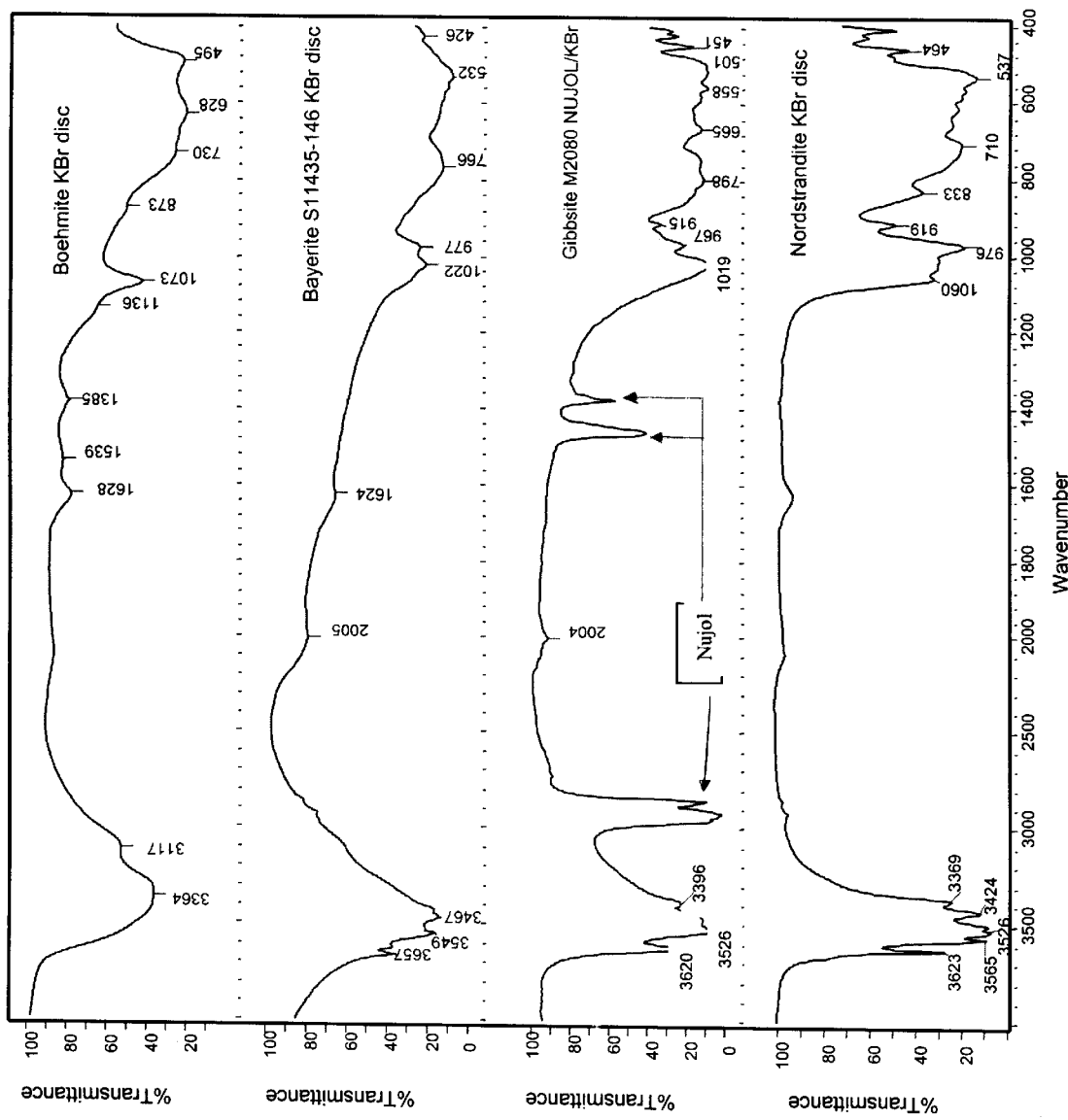
FIG. 2 shows the FTIR spectra for boehmite, Bayerite, Gibbsite and Nordstrandite.
Figure 3:
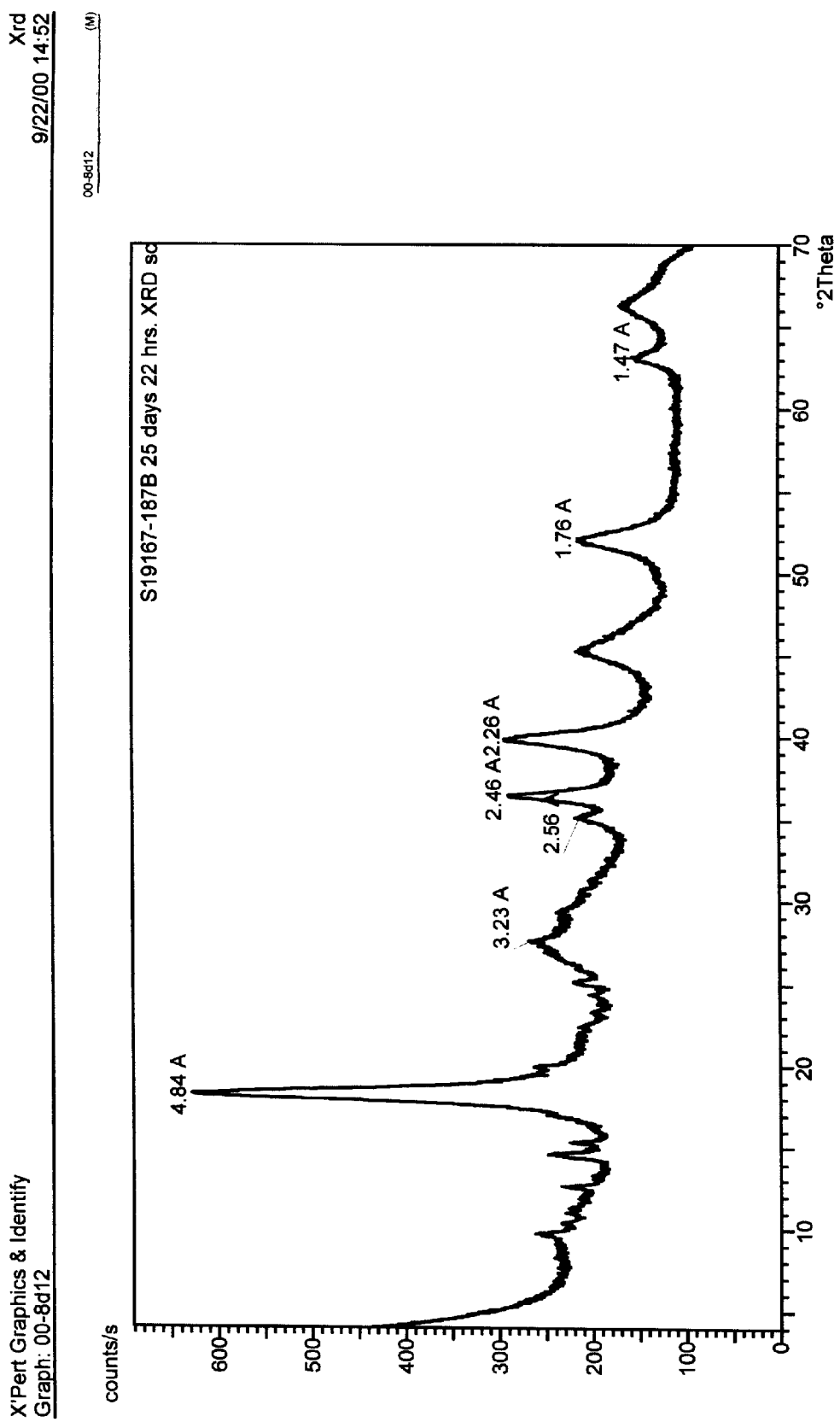
FIG. 3 shows a 22 hour scan X-Ray Diffraction pattern for the sample aged for 25 days at 90° C. The marked lines are for Kamenetsite. Several unmarked lines present below 5 Å d-spacing, are due to organic species present in the oven-dried sample. There are also broad diffraction lines attributable to the γ-alumina support and the active metal oxides.

In addition, Fourier Transform Infra-Red (FTIR) spectroscopy analysis has been carried out on the 90° C., 1-day-aged and 25-day-aged low-temperature dried products. These spectra are shown in FIG. 1. The enhanced presence of Kamenetsite in the 25-day-aged material is clearly seen when the 1-day-aged material spectrum is subtracted from the 25-day-aged material spectrum, shown as the "difference" spectrum at the bottom of FIG. 1. FTIR bands at 3512, 989, and 521 wave numbers in the "difference" spectrum confirm the presence of Al(OH)$_3$. For comparison, the FTIR spectra of boehmite, Bayerite, Gibbsite and Nordstrandite are shown in FIG. 2.

Comparison with Material Produced without Silica in the Starting Material

The appearance of Kamenetsite in material produced by the process of the present invention is not readily apparent when the starting material contains less than about 4 wt. % silica. A correlation has been developed, however, that permits the indirect determination of the amount of Kamenetsite contained in the product of the process of the present invention. This correlation relates the amount of Kamenetsite in a product to its texture as determined by its porosity measured by the adsorption of nitrogen. Based upon an extrapolation of this correlation, it is possible to conclude that a small amount of Kamenetsite is probably present in material produced using silica-free alumina as a starting material. The data showing these extrapolated values for Kamenetsite in materials produced from such silica-free alumina are shown in Examples D and E.

EXAMPLES

The present invention as described above will be further exemplified by the following specific examples which are provided by way of illustration and not limitation thereof.

TEST CONDITIONS

Test conditions used in comparing the performance of catalysts of the present invention against those of U.S. Pat. No. 6,015,485 and a standard refinery catalyst are:

| Test Type A | | |
|---|---|---|
| Feedstock: | Straight-run gas oil for North American refiner. | |
| | Sulfur, wt. %: | 1.25 |
| | Total Nitrogen, ppm | 65 |
| | Density, g/cc | 0.848 |
| | Aromatics, wt. % | 8.63 |
| | Diaromatics, wt. % | 2.63 |
| | Distillation, ° C.: | |
| | Initial | 114.5 |
| | 50% | 286.7 |
| | 95% | 368.9 |
| Test Conditions: | | |
| | Temperature, ° C. | 343 |
| | Pressure, psig | 590 |
| | Gas Rate, SCF/B | 1000 |
| | Liquid Hourly Space Velocity (LHSV), hr$^{-1}$ | 2 |
| Test Type B | | |
| Feedstock: | Straight-run light Arabian gas oil for European refiner. | |
| | Sulfur, wt. %: | 1.77 |
| | Total Nitrogen, ppm | 183 |
| | Density, g/cc | 0.863 |
| | Aromatics, wt. % | 12.94 |
| | Diaromatics, wt. % | 4.46 |
| | Distillation, ° C.: | |
| | Initial | 175 |
| | 50% | 290.6 |
| | 95% | 366.7 |
| Test Conditions: | | |
| | Temperature, ° C. | 360 |
| | Pressure, psig | 588 |
| | Gas Rate, SCF/B | 1000 |
| | Liquid Hourly Space Velocity (LHSV), hr$^{-1}$ | 1, 2 and 3 |
| Test Types $C_1$, $C_2$, $C_3$ | | |
| Feedstock: | Gas Oil blend | |
| | Sulfur, wt. %: | 1.637 |
| | Total Nitrogen, ppm | .401 |
| | Density, g/cc | 0.887 |
| Test Conditions: | | |
| | Temperature, ° C. | $C_1$ = 343; $C_2$ = 357; $C_3$ = 371 |
| | Pressure, psig | 675 |
| | Gas Rate, SCF/B | 1200 |
| | Liquid Hourly Space Velocity (LHSV), hr$^{-1}$ | 2.7 |
| Test Type D | | |
| Feedstock: | Straight-Run/Light Cycle Gas Oil blend | |
| | Sulfur, wt. %: | 0.8 |
| | Total Nitrogen, ppm | 196 |
| | Density, g/cc | 0.889 |

-continued

| Test Conditions: | | |
|---|---|---|
| | Temperature, ° C. | 349 |
| | Pressure, psig | 580 |
| | Gas Rate, SCF/B | 1000 |
| | Liquid Hourly Space Velocity (LHSV), hr$^{-1}$ | 2.0 |
| Test Types E$_1$, E$_2$ | | |
| Feedstock: | Straight-Run/Light Cycle Gas Oil blend | |
| | Sulfur, wt. %: | 0.508 |
| | Total Nitrogen, ppm | 760 |
| | Density, g/cc | 0.859 |
| Test Conditions: | | |
| | Temperature, ° C. | E$_1$ = 343; E$_2$ = 385 |
| | Pressure, psig | 700 |
| | Gas Rate, SCF/B | 1000 |
| | Liquid Hourly Space Velocity (LHSV), hr$^{-1}$ | 2.4 |
| Test Type F | | |
| Feedstock: | Straight-Run Light Arabian Gas Oil | |
| | Sulfur, wt. %: | 1.005 |
| | Total Nitrogen, ppm | 251 |
| | Density, g/cc | 0.864 |
| Test Conditions: | | |
| | Temperature, ° C. | 363 |
| | Pressure, psig | 580 |
| | Gas Rate, SCF/B | 1000 |
| | Liquid Hourly Space Velocity (LHSV), hr$^{-1}$ | 3.0 |

Example 1

This example describes the preparation of samples of catalysts of the present invention.

A powder comprising alumina particles coated with 6 wt. % silica was mulled, extruded into a trilobe shape, dried and calcined by conventional means. Details of the 6 wt. % silica-alumina powder has been described in the open literature (McMillan M., Brinen, J. S., Carruthers, J. D. and Haller, G. L., "A $^{29}$Si NMR Investigation of the Structure of Amorphous Silica-Alumina Supports", Colloids and Surfaces, 38 (1989) 133–148). The powder used here met the criterion for porosity stability as described in the above publication.

95.6 grams of the silica-alumina support was impregnated to incipient wetness with 100 ml of solution "A". The solution, designated herein as solution "A", consisted of a mixture of two solutions: solution "C" prepared by adding 11.3 grams of ammonium hydroxide solution (28 wt. %) to 65.3 grams of Dow Versene, Tetraammonium ethylenediaminetetraacetic acid solution (38.0% as EDTA) and solution "D". Solution "D" was prepared by adding 4.37 grams of ammonium hydroxide solution (28 wt. %) to 41.0 grams of solution "E". The solution, designated herein as solution "E", was prepared by adding 137 grams of cobalt carbonate solid to 500 grams of a dilute solution of phosphoric acid (23.0 grams of H$_3$PO$_4$-86.0 wt. %- and 475 grams of deionized water), heating the mixture to 55° C. and then adding 300 grams of Climax MoO$_3$. The mixture was then heated to 98° C. with stirring for 1.5 hrs at which point 100 grams of nitric acid solution (70 wt. %) were added to fully dissolve the mix. This solution, designated herein as Solution "E", of phosphoric acid containing cobalt and molybdenum compounds wherein the Co/Mo weight ratio was 0.258 and having a pH of approximately 0.6 was then cooled to room temperature and 41.0 grams of the solution were used to prepare solution designated herein as solution "D".

The wet pills were allowed to stand for 2 hours and then dried in an oven in a shallow layer at 230° C. for 1 hour.

122.6 grams of dried product were then dipped into a container of solution "E" and 360 grams of this solution were then circulated to wash the pills. The wet pills were then separated from the excess solution by centrifugation and placed in a sealed bottle in an oven set at 75° C. and held at that temperature for 3 days. The material was then fast-dried at 230° C. for 20 minutes to volatilize the carrier liquid to an LOI of 30–32 wt. %, followed by calcination at 500° C. for one hour in air to produce a catalyst of the present invention, designated herein as Catalyst C-2. Catalyst C-2 contained 5.97 wt. % Co, 19.7 wt. % Mo and 0.77 wt. % P and had a surface area of 305 m$^2$/g and estimated Kamenetsite intensity of 3344 counts.

A second 100 gram portion of the support was wetted to incipient wetness with a solution comprising 62.5 grams of Dow Versene diammonium ethylenediaminetetraacetic acid solution (40.0 wt. % as EDTA) and 77.59 grams of solution designated herein as solution "F". Solution "F" was prepared by adding 329 grams of MoO$_3$, 100.0 grams of Co(OH)$_2$ and 282.6 grams of citric acid monohydrate to 695 grams of deionized water and heated from room temperature to 80° C. The solution was then boiled for approximately one hour until all components became fully dissolved and then cooled to room temperature. Solution "F" contained cobalt and molybdenum compounds wherein the Co/Mo weight ratio was 0.292 with a pH of approximately 0.6. The wet pills were allowed to soak for one hour followed by drying in a shallow layer in a dryer at 230° C. for one hour.

The dried pills were then immersed in 300 grams of solution "F" and the solution circulated over the pills for one hour. The wet pills were separated from the solution by centrifugation and placed in a sealed bottle in an oven set at 75° C. for 3 days. The material was then fast-dried at 230° C. for 1 hour to volatilize the carrier liquid to an LOI of 30–32 wt. %, and then calcined at 500° C. for 1 hour to produce a catalyst of the present invention, designated herein as Catalyst D-2. Catalyst D-2 contained 4.11 wt. % Co and 16.3 wt. % Mo and had a surface area of 347 m$^2$/g and estimated Kamenetsite intensity of 4320 counts.

A third 100 gram portion of the support was wetted to incipient wetness with a solution containing 64.7 grams of Dow Versene diammonium ethylenediaminetetraacetic acid (40.0 wt. % as EDTA) with 82.3 grams of a solution, designated herein as Solution "G". Solution "G" was prepared by adding 300 grams of $MoO_3$ and 137.5 grams of $CoCO_3$ to 575 grams of deionized water followed by heating to 70–80° C. with stirring, and then adding slowly 225.0 grams of citric acid monohydrate. The solution was then boiled to complete dissolution for 30 minutes and then allowed to cool. Solution "G", containing cobalt and molybdenum compounds wherein the Co/Mo weight ratio was 0.321 had a pH of approximately 2.0. The wet pills were allowed to stand for 1 hour and then dried in a shallow layer in an oven set at 230° C. for an hour.

The dried pills were then immersed in 300 grams of solution "G" and the solution circulated over the pills for one hour. The wet pills were separated from the solution by centrifugation and placed in a sealed bottle in an oven set at 75° C. for 3 days. The material was then fast-dried at 230° C. for one hour to volatilize the carrier liquid to an LOI of 30–32 wt. %, and then calcined at 500° C. for an additional hour to produce a catalyst of the present invention, designated herein as Catalyst E-2. Catalyst E-2 contained 4.53 wt. % Co and 14.6 wt. % Mo and had a surface area of 310 $m^2/g$ and estimated Kamenetsite intensity of 1082 counts.

Example 2 (Comparative)

This example describes the preparation of samples of catalysts of U.S. Pat. No. 6,025,485.

A support was made using the same procedure as in Example 1, except that the starting material contained no silica.

A portion of this support was treated in the same manner as Catalyst C-2 to yield Catalyst C-1. Catalyst C-1 contained 4.67 wt. % Co, 18.1 wt. % Mo and 0.61 wt. % P and had a surface area of 280 $m^2/g$ and estimated Kamenetsite intensity of 195 counts.

A second portion of this support was treated in the same manner as Catalyst D-2 to yield Catalyst D-1. Catalyst D-1 contained 4.08 wt. % Co and 14.7 wt. % Mo and had a surface area of 230 $m^2/g$ and estimated Kamenetsite intensity of less than 100 counts.

Example 3 (Comparative)

This example describes the preparation of two catalysts prepared by the method of the present invention but with insufficient and with marginally sufficient silica in the starting material to produce a catalyst of the present invention.

A support was made using the same procedure as in Example 1, except that the starting material contained 2 wt. % silica. This support was treated in the same manner as Catalyst E-2 to yield Catalyst E-1. Catalyst E-1 contained 5.91 wt. % Co and 19.7 wt. % Mo and had a surface area of 215 $m^2/g$ and estimated Kamenetsite intensity of 300 counts.

A second support was made using the same procedure as in Example 1, except that the starting material contained 3.7 wt. % silica, lower than the preferred (6 wt. %) yet higher than the 2 wt. % used for Catalyst E-1. This support was treated in the same manner as Catalyst D-2 to yield Catalyst D-3. Catalyst D-3 contained 4.08 wt. % Co and 15.7 wt. % Mo and had a surface area of 245 m2/g and estimated Kamenetsite intensity of 1880 counts.

Example 4

This example compares the performance of Catalyst C-2 to Catalyst C-1 and a refinery standard catalyst ("Standard"), manufactured by conventional means.

Each catalyst was subjected to Test Type A. The results are presented in Table 3:

TABLE 3

| Catalyst | $S_{product}$, wppm | RVA (1) |
|---|---|---|
| Standard | 330 | 100 |
| C-1 | 175 | 143 |
| C-2 | 91 | 202 |

(1) Relative Volume Activity (RVA) is the ratio of the rate constants for the catalysts determined from the concentration of sulfur in the product.

This test shows that Catalyst C-2, that of the present invention, is more effective at removing sulfur than either of the other two catalysts.

Example 5

This example compares the performance of Catalyst D-2 to Catalyst D-1 and a refinery standard catalyst ("Standard"), manufactured by conventional means.

Each catalyst was subjected to Test Type B. The results are presented in Table 4:

TABLE 4

| Catalyst | $S_{product}$, wppm | RVA (1) |
|---|---|---|
| Standard | 350 | 100 |
| D-1 | 350 | 117 |
| D-2 | 350 | 143 |

(1) Relative Volume Activity (RVA) is the ratio of the LHSV necessary to achieve 350 wppm sulfur in the product.

This test shows that a lesser amount of Catalyst D-2 of the present invention is required to achieve a desired sulfur level in the product than either of the other two catalysts.

Example 6

This example compares the performance of Catalyst E-2 to Catalyst E-1 and a refinery standard catalyst ("Standard"), manufactured by conventional means.

Each catalyst was subjected to Test Type B. The results are presented in Table 5:

TABLE 5

| Catalyst | $S_{product}$, wppm | RVA (1) |
|---|---|---|
| Standard | 350 | 100 |
| E-1 | 350 | 102 |
| E-2 | 350 | 124 |

(1) Relative Volume Activity (RVA) is the ratio of the LHSV necessary to achieve 350 wppm sulfur in the product.

This test shows that a lesser amount of Catalyst E-2 of the present invention is required to achieve a desired sulfur level in the product than either of the other two catalysts. The test also shows that the use of a starting material containing insufficient silica in the catalyst preparation procedure of the present invention produces a catalyst, i.e., Catalyst E-1, that is no more effective than a standard refinery catalyst.

Example 7

This example describes the preparation of samples of catalysts of the present invention in which both Ni and Co are included in the finished catalyst and the preparations are subjected to significantly different aging conditions.

100 grams of the silica-alumina support described in Example 1 was impregnated to incipient wetness with 152.4 grams of solution "K". The solution, designated herein as solution "K" consisted of a mixture of two solutions: 68.0 grams of solution "L" prepared by adding 6.66 grams of solid nickel acetate (23.58 wt. % Ni metal) to 99.54 grams of Dow Versene diammonium ethylenediaminetetraacetic acid solution (40 wt. % as EDTA) and 84.4 grams of solution "F" described in Example 1, above.

The wet pills were allowed to stand for 2 hours as before and then dried in an oven in a shallow layer at 230° C. for 1 hour. 143.8 grams of dried product were then dipped into a container of solution "F" and 317 grams of this solution were then circulated to wash the pills. The wet pills were then separated from the excess solution by centrifugation and placed in a sealed bottle in an oven set at 75° C. and held at that temperature for 3 days. The material was then fast-dried at 230° C. for 20 minutes to volatilize the carrier liquid to an LOI of 30–32 wt. %, followed by calcination at 500° C. for one hour in air to produce a catalyst of the present invention, designated herein as Catalyst A. Catalyst A contained 4.3 wt. % Co, 17.0 wt. % Mo and 0.68 wt. % Ni and had a surface area of 347 m²/g and estimated Kamenetsite intensity of 2670 counts.

A second preparation followed the identical scheme for Catalyst A but was aged at 90° C. for 7 days instead of the 75° C. for 3 days. This catalyst was designated herein as Catalyst B. Catalyst B contained 4.24 wt. % Co, 16.8 wt. % Mo and 0.68 wt. % Ni and had a surface area of 340 m²/g and estimated Kamenetsite intensity of 6138 counts.

Example 8

This example demonstrates that the activity of a catalyst of the present invention improves relative to that of a refinery standard catalyst as operating conditions are intensified.

Catalyst A and a refinery standard catalyst ("Standard"), manufactured by conventional means, were each subjected to Test Types $C_1$, $C_2$ and $C_3$, which were identical except that operating temperature increased from $C_1$ through $C_3$. The test results are presented in Table 6.

TABLE 6

| Catalyst | Test Type | | | | | |
|---|---|---|---|---|---|---|
| | $C_1$ | | $C_2$ | | $C_3$ | |
| | RVA-HDS (1) | $S_{product}$ | RVA-HDS (1) | $S_{product}$ | RVA-HDS (1) | $S_{product}$ |
| Standard | 100 | 797 | 100 | 420 | 100 | 209 |
| A | 132 | 584 | 144 | 261 | 159 | 112 |

(1) Relative Volume Activity (RVA) is the ratio of the rate constants for the catalysts determined from the concentration of sulfur in the product.

Note the increase in the relative volume activity as operating temperature is increased from 343° C. to 357° C. to 371° C. These data show that the performance of a catalyst of the present invention relative to that of a refinery standard catalyst increases as operating conditions are intensified.

Example 9

This example illustrates the ability to tailor catalysts of the present invention to the operating conditions that are expected.

Catalyst A, Catalyst B and a refinery standard catalyst ("Standard"), manufactured by conventional means, were each subjected to Test Types D, $E_1$ and $E_2$. The feedstock for Test Type D contained a moderate concentration of nitrogen (196 wppm), whereas the feedstock for Test Types $E_1$ and $E_2$ had a high nitrogen content (760 wppm).

In this example the performance the Catalyst A of the invention is contrasted with the performance of Catalyst B prepared with a much higher concentration of Kamenetsite in its precursor material. This increase in Kamenetsite was achieved by increasing both the temperature and the time during the aging step. This enhanced aging increased the concentration and the crystallite size of the Kamenetsite. Along with the change in Kamenetsite, the pore structure of the final catalyst underwent significant change. The modified catalyst then displayed a quite different response to an increase in temperature during hydrodesulfurization of just one of the gas oils. This can be seen in the following test results, presented in Table 7.

TABLE 7

| Catalyst | Test Type | | | | | |
|---|---|---|---|---|---|---|
| | D | | $E_1$ | | $E_2$ | |
| | RVA-HDS (1) | $S_{product}$ | RVA-HDS (1) | $S_{product}$ | RVA-HDS (1) | $S_{product}$ |
| Standard | 100 | 224 | 100 | 313 | 100 | 51 |
| A | 123 | 159 | 121 | 234 | 100 | 55 |
| B | 130 | 143 | 128 | 213 | 131 | 34 |

(1) Relative Volume Activity (RVA) is the ratio of the rate constants for the catalysts determined from the concentration of sulfur in the product.

In this Table the three catalysts are listed with a minimal amount of description . . . the industry-standard Reference Catalyst, Catalyst A, a catalyst of the invention prepared so that it displays a moderate concentration of Kamenetsite in the precursor material and Catalyst B, a catalyst displaying a high concentration of Kamenetsite in its precursor material. Each catalyst was then tested alongside the others at constant temperature and pressure using two Straight-Run/Light Cycle Gas Oil blends as described in Test Type D and E. G1 and G2.

Under Test Type D, both catalysts of the present invention are more active than the Standard with the higher Kamenetsite catalyst slightly better of the other (130 vs. 123 RVA). A similar result is achieved for Test Type $E_1$. However, notice that when the processing conditions are changed for the three catalysts in Test Type $E_2$, the higher Kamenetsite-version maintains its performance advantage but that of the lower concentration version falls back.

Without wishing to be bound by any particular theory, it is believed that catalysts prepared from materials high in Kamenetsite possess more active sites per unit volume of catalyst than conventionally prepared catalysts. In the example shown above, the two catalysts of the invention responded differently to an increase in temperature during Test Type $E_2$. The Test Type E feedstock differed from the Test Type D gas oil primarily in the concentration of nitrogen-containing molecules.

Under the low pressure and low hydrogen treat-rate conditions of these tests, removal of nitrogen-containing molecules is far from complete. In addition, the unconverted nitrogen-containing molecules become hydrogenated (basic) nitrogen molecules during partial (incomplete) hydrodenitrogenation of the gas oil. Such molecules are known to reduce the activity of the desulfurization catalyst by adsorption on its more acidic sites. It is therefore reasonable to propose that the catalyst achieving more removal of nitrogen-containing molecules (Catalyst B) and possessing more available HDS sites, will lessen the 'dynamic poisoning effect' of the remaining nitrogen-containing molecules and thereby maintain a higher hydrodesulfurization activity in the catalyst. These data therefore indicate that catalysts of the invention could be tailored for optimum performance depending upon the different concentrations of nitrogen-containing molecules in the feedstock.

Example 10

This example compares the performance of a catalyst prepared with a "sufficient" level of silica in the silica-alumina and a catalyst prepared with a "marginally sufficient" level of silica in the silica-alumina support. Catalyst D-2 is compared to Catalyst D-3 and a refinery standard catalyst ("Standard"), manufactured by conventional means, in a standard test, Test Type F.

TABLE 8

| Catalyst | $S_{product}$, wppm | RVA (1) |
|---|---|---|
| Standard | 212 | 100 |
| D-2 | 117 | 140 |
| D-3 | 161 | 117 |

(1) Relative Volume Activity (RVA) is the ratio of the rate constants for the catalysts determined from the concentration of sulfur in the product.

This test shows that the use of a starting material containing marginally sufficient silica in the catalyst preparation procedure of the present invention produces a catalyst, i.e., Catalyst D-3, that is more effective than a standard refinery catalyst but is not as active as the catalyst with sufficient silica in the silica-alumina support, Catalyst D-2

We claim:

1. A composition comprising an aluminum trihydroxide phase having measurable X-ray diffraction peaks between about 2θ=18.15° and about 2θ=18.50°, between about 2θ=36.1° and about 2θ=36.85°, between about 2θ=39.45° and about 2θ=40.30°, and between about 2θ=51.48° and about 2θ=52.59°.

2. The composition of claim 1 further characterized in that the aluminum trihydroxide phase has measurable X-ray diffraction peaks between about 2θ=27.35° and about 2θ=27.90°, between about 2θ=34.75° and about 2θ=35.48°, and between about 2θ=62.40° and about 2θ=63.80°.

3. The composition of claim 1 further characterized in that the aluminum trihydroxide phase does not have measurable X-ray diffraction peaks between about 2θ=20.15° and about 2θ=20.65°.

4. The composition of claim 1 further characterized in that the aluminum trihydroxide phase does not have measurable X-ray diffraction peaks between about 2θ=20.15° and about 2θ=20.65° and between about 2θ=37.35° and about 2θ=37.75°.

5. The composition of claim 1 further characterized in that the aluminum trihydroxide phase does not have measurable X-ray diffraction peaks between about 2θ=18.70° and about 2θ=18.90°, between about 2θ=20.30° and about 2θ=20.50°, and between about 2θ=40.30° and about 2θ=40.70°.

6. The composition of claim 1 further characterized in that the aluminum trihydroxide phase has measurable X-ray diffraction peaks between about 2θ=27.35° and about 2θ=27.90°, between about 2θ=34.75° and about 2θ=35.48°, and between about 2θ=62.40° and about 2θ=63.80°; and does not have measurable peaks between about 2θ=18.70° and about 2θ=18.90°, between about 2θ=20.15° and about 2θ=20.65°, between about 2θ=37.35° and about 2θ=37.75° and between about 2θ=40.30° and about 2θ=40.70°.

7. A process for making a composition comprising an aluminum trihydroxide phase having measurable X-ray diffraction peaks between about 2θ=18.15° and about 2θ=18.50°, between about 2θ=36.1° and about 2θ=36.85°, between about 2θ=39.45° and about 2θ=40.30°, and between about 2θ=51.48° and about 2θ=52.59°, comprising:

(a) wetting a starting material comprising silica coated amorphous alumina comprising between about 4 wt. % and about 8 wt. % silica, wherein at least about 20 wt. % of said alumina is amorphous, by contact with a chelating agent in a carrier liquid and a metallic compound;

(b) aging the so-wetted starting material while wet;

(c) drying the so-aged starting material at a temperature between about 100° C. and about 230° C. and under conditions to substantially volatilize the carrier liquid; and (d) calcining the so-dried material.

* * * * *